United States Patent [19]

Benson et al.

[11] Patent Number: 5,761,407
[45] Date of Patent: Jun. 2, 1998

[54] MESSAGE BASED EXCEPTION HANDLER

[75] Inventors: Frank Edward Benson, Kasson; Daniel Rodman Hicks, Byron, both of Minn.

[73] Assignee: International Business Machines Corporation, Armonk, N.Y.

[21] Appl. No.: 31,741

[22] Filed: Mar. 15, 1993

[51] Int. Cl.[6] ............................ G06F 11/00; G06F 11/30
[52] U.S. Cl. ........................ 395/183.13; 395/183.14; 395/185.02; 395/185.03
[58] Field of Search ........................ 395/575, 183.08, 395/183.09, 183.11, 183.13, 183.14, 183.15, 185.02, 185.03, 183.1

[56] References Cited

U.S. PATENT DOCUMENTS

| | | | |
|---|---|---|---|
| 4,575,817 | 3/1986 | Allen et al. | 395/275 |
| 4,777,593 | 10/1988 | Yoshida | 364/200 |
| 4,970,641 | 11/1990 | Hester et al. | 364/200 |
| 5,095,426 | 3/1992 | Senta | 395/375 |
| 5,109,514 | 4/1992 | Garner et al. | 395/125 |
| 5,197,138 | 3/1993 | Hobbs et al. | 395/375 |
| 5,237,700 | 8/1993 | Johnson et al. | 395/775 |
| 5,241,635 | 8/1993 | Papadopoulos et al. | 395/375 |
| 5,305,455 | 4/1994 | Anschlietz et al. | 395/700 |

*Primary Examiner*—Robert W. Beausoliel, Jr.
*Assistant Examiner*—P. Vales
*Attorney, Agent, or Firm*—Steven W. Roth

[57] ABSTRACT

The solution employed by the present invention keeps information about individual exception instances in data structures which are independent of the local storage of the system-level exception management routines. This eliminates confusion and ambiguity because the entire exception handling mechanism can be described and specified in terms of the manipulation of these data structures, independent of the call/return flow of the system-level exception management routines.

11 Claims, 10 Drawing Sheets

MESSAGE BASED EXCEPTION HANDLER

RELATED APPLICATIONS

The present application is related to an application filed on Sep. 6, 1991, with a Ser. No. of 755,706, and entitled "PROGRAM CONDITION HANDLING." Hereafter referred to as Related Application I.

The present application is also related to an application filed on Sep. 6, 1991, with a Ser. No. of 755,708, and entitled "METHOD AND SYSTEM FOR REPRESENTING AND SIGNALING RUN-TIME PROGRAM CONDITIONS." Hereafter referred to as Related Application II.

FIELD OF THE INVENTION

This invention relates to the data processing field. More specifically, this invention relates to error/exception handling within a computer system.

BACKGROUND OF THE INVENTION

The development of the EDVAC computer system of 1948 is often cited as the beginning of the computer era. Since that time, computer systems have found their way into just about every aspect of the American life style. One reason for this proliferation is the ability of computer systems to perform a variety of tasks in an efficient manner. The mechanisms used by computer systems to perform these tasks are called computer programs.

The "call/return stack" is the basic means by which computer systems allow computer programs to execute and thereby perform their respective tasks. When a computer program is called to execute, the computer system creates a record to track critical information about the particular computer program. These records are called activation records. When this first computer program calls (invokes) another computer program, the computer system creates another activation record that represents the second computer program. This process is repeated every time a call to an additional computer program is made. The activation records which result from this series of invocations are said to be logically "stacked" on top of one another (hence the name "call/return stack"). Generally, each new activation record is thought to be placed on top of the call/return stack (hereafter, the stack). The routine whose activation record is top most on the stack is called the "running program."

While the design of mechanisms to maintain and manipulate computer programs on the stack is relatively straightforward, the ability to easily and efficiently handle errors within this framework is a long-standing problem. The traditional solution to this problem involves the use of "return codes." Return codes are parameters passed back from calls to other routines which indicate whether or not the called routines completed successfully. Return codes may also indicate the cause of the failure if a failure did indeed occur. While return code schemes provide an effective solution in some situations, they nevertheless are subject to several significant deficiencies. These deficiencies include: the cost associated with setting, passing, and checking the return code parameter, the loss of error information (beyond that provided in the return code), and the inability to correct the error "on the fly" and allow the failing routine to continue.

To solve the problems inherent in these return code schemes, several machines, operating systems, and languages include "exception" mechanisms of one sort or another. These mechanisms generally differ from each other in a number of significant ways, but they all have at least one basic concept in common: When an error is detected, execution of the current (failing) routine is suspended, and a call to an "exception handler" routine is performed via a more-or-less "invisible" mechanism.

While this exception approach to error reporting and handling, has some deficiencies of its own, it overcomes most of the above-listed deficiencies of the "return code" approach. However, the principal deficiency of the exception approach is that no two implementations are alike or even particularly source-language compatible with each other. In particular, the languages PL/I, Ada, and Modula-3 have defined mutually-incompatible exception models, and the C language, while it has no exception model defined as a part of the actual language syntax/semantics, is generally supplied with library support for an exception model which is incompatible with the other three. Thus the challenge is to define an abstract architectural model which is sufficiently flexible to support these divergent language models, while still allowing the languages to work together in a predictable and reasonable fashion.

The primary source of incompatibility is the presence or absence of termination semantics in the model. The Ada language has a classical terminating model, in that exception handlers are scoped to the routines or blocks of code where they are defined, and, prior to calling one of these exception handlers, all routines called from the defining routine are terminated. Among other things, this means that after an exception is "handled," execution can never resume at the point of the original exception, but rather must resume at the exit point of the defining routine or block.

The standard C language library support, on the other hand, has a "nonterminating" exception model. When an exception occurs, routines already called are left in a called state, and the exception handler routine is invoked more or less as if it had been called from the point of the exception. In this model, if an exception is "handled," execution normally resumes at the original point of the exception, with Ada-style "termination" being possible only through explicit programmer action.

A second source of incompatibility is the possibility, in a "non-terminating" model, that an exception will be "resignaled," causing exception handlers to be invoked a second time for a single exception. The PL/I language is a classical example of this: Unhandled exceptions are resignaled as "FAILURE" exceptions, presumably to allow some amount of cleanup before execution of the entire application is terminated. This ability to resignal, however, creates problems for many exception models, in that they are "static" in nature and don't readily support the recursion or reentrancy.

A third source of incompatibility is the ability to associate "exception data" with the exception. For instance, if a file "open" operation fails because the named file does not exist, it is useful (for both diagnostic and recovery purposes) to associate the file name presented to the "open" routine with the "file not found" exception. Most exception models provide little support for such exception data. Technically, managing and tracking exception data is a difficult task, particularly for nonterminating models which support resignal, since the possibilities for recursion imply that the number of separate pieces of exception data extant at any one time is unlimited.

The first two incompatibility problems described above are, in principle, solved by the "two cursor model" described in Related Application I. In this model each exception is associated with two potentially different activation records on the stack at one time. One called routine is addressed by the "resume cursor" associated with each exception occurrence—this routine is where execution would resume if the exception is "handled." The other called routine is addressed by the "handle cursor" associated with each exception occurrence—this routine is the one whose exception handler definitions are to be examined next in order to select an appropriate exception handling routine.

In this "two cursor model," the "handle cursor" can be manipulated relatively freely; moving the handle cursor from a routine to its caller is called "percolation," while moving the handle cursor in the opposite direction (towards more recently called routines) is called "resignaling" an exception. The "resume cursor," on the other hand, is more restricted in its motion. It can only be moved in the direction of older called routines (ie. from callee to caller), and, each time it is moved, the "exited" routine (the called routine that was previously addressed by the resume cursor) is examined for any "termination handlers" (alternatively named "exit handlers") that it might define.

If any termination handler definitions are found, the associated handler routines are invoked (in a fashion similar to exception handler routines) and allowed to perform any necessary "clean-up" for the defining routine. The restrictions on the manipulation of the resume cursor assure that termination handler routines for abnormally terminated called routines will be invoked once and only once. In contrast, exception handler routines may be invoked multiple times or skipped entirely as a result of handle cursor manipulation.

While the prior art solution described in Related Application I makes it possible for skilled programmers to design programs which are "robust" in their treatment of errors without requiring a global knowledge of all error conditions and error handling that might occur within parts of the program, significant problems remain.

There are two fundamental problems with the "two cursor model" described in Related Application I. The first is that the mechanisms, as set forth therein, cannot, without great difficulty and complexity, manage the potential recursion/reentrancy of the model and still allow the simple and free manipulation of the "cursors". A particular problem is that "dead" called routines (routines which have been terminated as as result of resume cursor motion) end up staying in the stack and, at best, "cluttering up" the situation. At worst, these "dead" called routines can occupy so much storage space that available storage resources are exhausted.

The second problem with the "two cursor model" (as described in Related Applications I and II) is the internalization of exception data. This problem relates to the third incompatibility problem described above (i.e., the management of exception data). Since information about individual exception instances is essentially maintained as variables in the local storage of the system-level exception management routines (rather than as separate data structures independent of the call/return flow), the ability to freely access and manage this information is restricted, and even the location of the information becomes ambiguous in certain recursive situations.

SUMMARY OF THE INVENTION

It is a principal object of this invention to provide an enhanced method and apparatus which supports "terminating" and "non-terminating" language models while nevertheless eliminating the "dead routine" problems which are present in prior art solutions.

It is another object of this invention to provide an enhanced method and apparatus which de-couples exception data from the subject activation record such that it can be accessed by other processes.

To solve the "dead routine" problem identified above, the invention employs the use of a "trap" mechanism for controlling the flow of execution during exception handling. The trap mechanism of the present invention sets a trap on a particular called (but not currently executing) routine, so that upon returning to that called routine control will immediately be returned to some system-level exception management routine (i.e., a "trap handler"). While this can be accomplished several ways (including, e.g., an explicit test generated at the return point of every call), the mechanism of the present invention involves modifying the "return address" of the called routine so that any attempt to return to the called routine results instead in a branch to system-level exception management code.

The trap handler of the present invention allows exceptions that are subsequently signalled to be placed in a "pending" state until such time as control returns to the trapped routine. It is in this manner the "dead routine" problem is avoided. There are no "dead routines" cluttering up the stack because the mechanism provides a means by which these routines can be removed from the stack before subsequent exceptions are handled.

Regarding the internalization problem of the prior art, the solution employed by the present invention keeps information about individual exception instances in data structures which are independent of the local storage of the system-level exception management routines. This eliminates confusion and ambiguity because the entire exception handling mechanism can be described and specified in terms of the manipulation of these data structures, independent of the call/return flow of the system-level exception management routines.

DESCRIPTION OF THE PREFERRED EMBODIMENT

Figure 1:
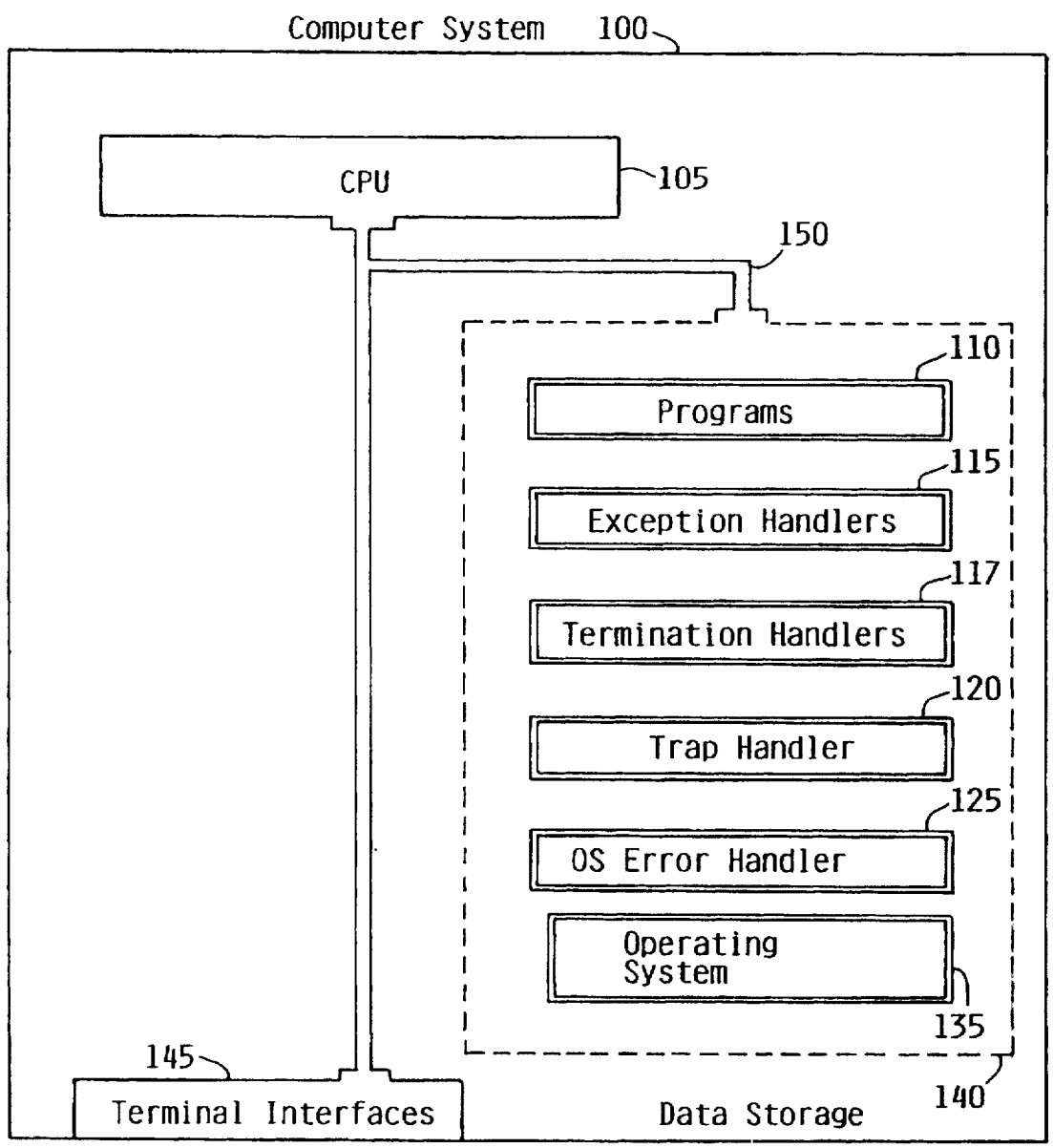
FIG. 1 shows the computer system of the preferred embodiment.

FIG. 1 shows a block diagram of the computer system of the present invention. The computer system of the preferred embodiment is an enhanced IBM AS/400 mid-range computer system. However, any computer system that support high level languages could be used. As shown in the exploded view of FIG. 1, computer system 100 comprises main or central processing unit (CPU) 105 connected to data storage 140 and terminal interface 145 via system bus 150.

Terminal interface 145 allows system administrators, computer programmers, and users to communicate with computer system 100, normally through programmable workstations. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used.

Data storage 140 contains computer programs 110 (hereafter programs), exception handlers 115, termination handlers 117, trap handler 120, OS error handler 125 and operating system 135. While data storage 140 is shown as a monolithic entity, it should be understood that it may comprise a variety of devices, and that all programs and files shown will not necessarily be contained in any one device.

For example, portions of programs 110 and operating system 135 will typically be loaded into primary memory to execute, while source data files will typically be stored on magnetic or optical disk storage devices.

Figure 2A:
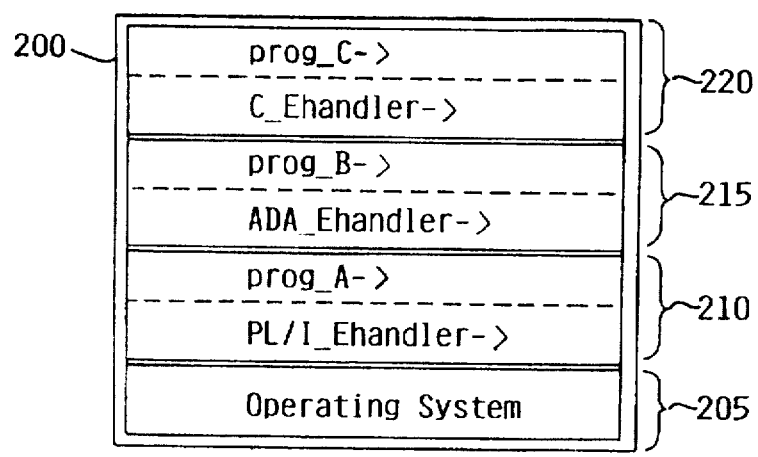
FIG. 2A shows a prior art call/return stack.

FIG. 2A shows a prior art stack that represents an example of a call scenario. Stack 200 comprises activation records 205, 210, 215, and 220. Activation record 205 is used to represent the operating system of a prior art solution, while activation records 210, 215, and 220 represent three different computer programs. Each of activation records 210, 215, and 220 are shown to include pointers to an executable computer program and to an exception handler for that particular computer program's language type. The respective languages of prog_A, prog_B, and prog_C are PL/I, ADA, and C.

Prog_A is shown by activation record 210. Since activation record 210 is first on the stack, it represents the computer program (i.e., prog_A) that, in this scenario, was the first to execute on computer system 100. Prog_A called (invoked) prog_B, so activation record 215 (i.e., the activation record that represents prog_B) was placed on the stack on top of activation record 210. Since in this example prog_B has in turn invoked prog_C, activation record 220 is shown at the top of stack 200.

Figure 2B:
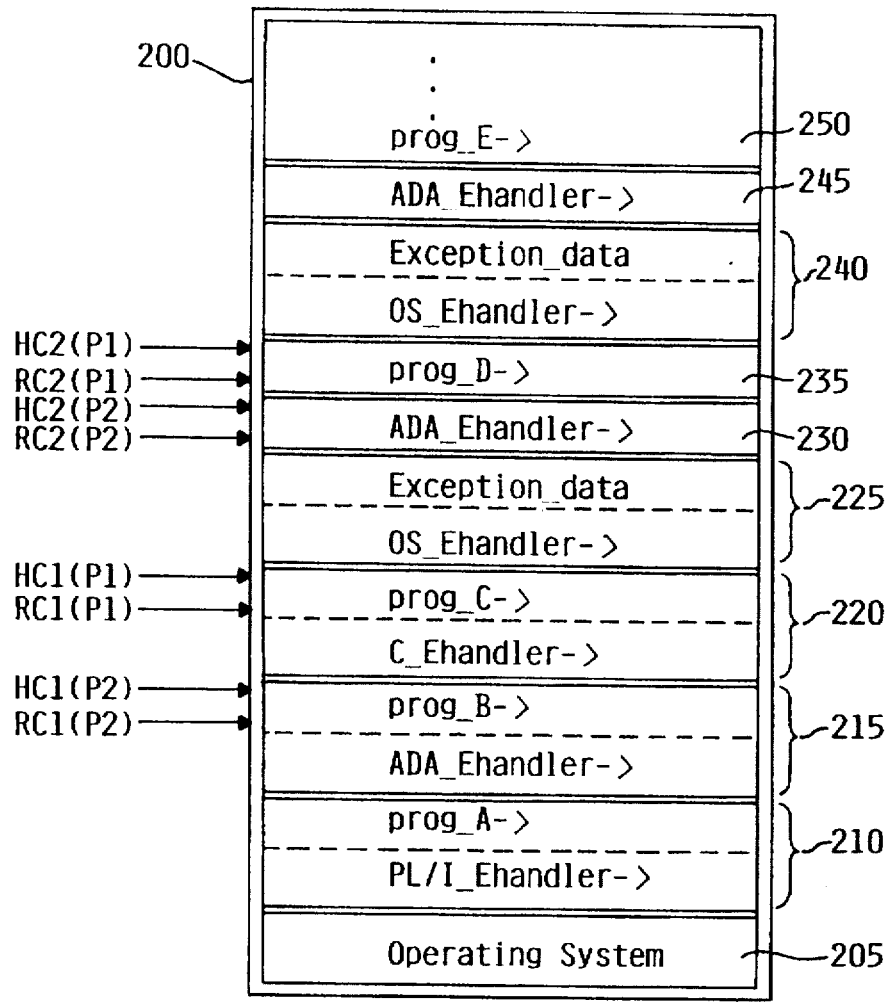
FIG. 2B shows a prior art call/return stack in which exceptions have been taken.

FIG. 2B is an exemplary illustration of the "dead routine" problem of prior art solutions. As mentioned above, prior art solutions associate two cursors with each exception. The first type of cursor, the handle cursor, points to the activation record on the stack which represents the computer program which is currently responsible for handling the exception while the second type of cursor, the resume cursor, points to the activation record on the stack which represents the computer program in which execution is to resume after the exception has been dealt with. The dead routine problem occurs when the computer program that is handling the exception (i.e., the exception handler being pointed to by the handle cursor) itself takes an exception. This is best explained by a step by step example.

In FIG. 2B, prog_C is the first program to take an exception. The resume and handle pointers are denoted on FIG. 2B as RC and HC respectively. Also shown in the representation of the cursors an exception number and a numeric pointer identifier which represents relative movement of a the subject cursor. For example, HC 1 (P1) represents the handle cursor for exception 1 at position 1. Initially, then, the resume and handle cursors will both point to activation record 220 [HC 1 (P1) and RC 1 (P1)]. An operating system error handler will then be invoked so that it may in turn invoke the appropriate exception handler for the C language (i.e., the exception handler pointed to by the C_Ehandler pointer of activation record 220). These steps are not shown. Assume for the purposes of this example that the C language exception handler is unable to handle the exception. It will then return to the operating system error handler which will move the handle cursor down to activation record 215 where the ADA exception handler will be invoked [HC 1 (P2)]. Activation record 230 represents the ADA exception handler. Since the ADA language uses a terminating exception handling model, the ADA exception handler will move the resume cursor from activation record 220 down to activation record 215 [RC 1 (P2)]. At this point, prog_C has become "dead routine." The ADA exception handler will then invoke prog_D (represented by activation record 235) to "clean up" after prog_C.

As with the first exception, the handle and resume cursors for this exception will initially point to activation record 235 [HC 2 (P1) and RC 2 (P1)]. The operating system error handler will again be invoked to deal with the problem (as shown by activation record 240). When the operating system error handler determines that prog_D does not have an exception handler associated with it, the operating system error handler will move the handle cursor down to activation record 230 and once again invoke the ADA exception handler [HC 2 (P2)]. This instance of the ADA exception handler is shown by activation record 245. In the terminating model, the ADA exception handler will then invoke another program to clean up after prog_D and move the resume cursor appropriately (i.e., down from activation record 235 to activation record 230) [RC 2 (P2)]. This, of course, makes prog_D another dead routine. If the problem goes on without solution, the memory used to support the stack will eventually be expended and the computer system would itself fail.

Figure 2C:
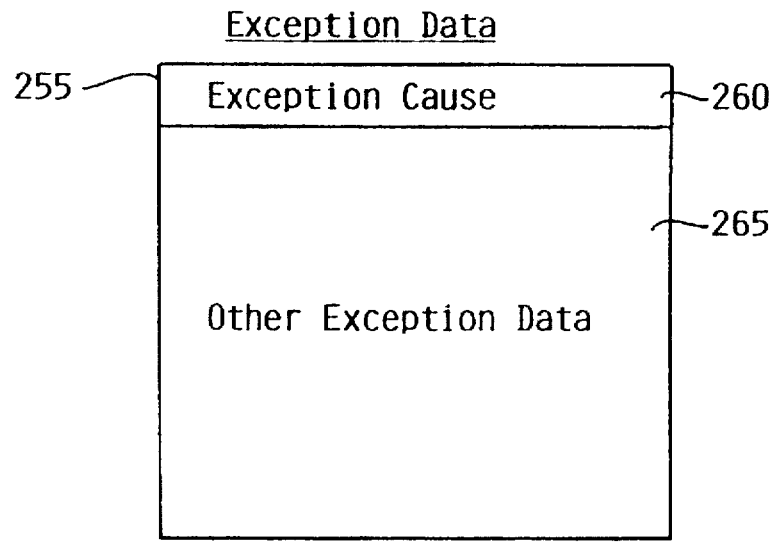
FIG. 2C shows a prior art exception data record.

As mentioned above, the second problem with prior art solutions is the management of exception data. As shown on FIG. 2B, the exception data of the prior art solutions is kept local to the operating system error handler that is responsible for the particular exception. FIG. 2C shows an example prior art exception data record. Exception data record 255 includes exception cause field 260 and other exception data 265. As its name indicates exception cause field 260 contains information about the cause of the exception. Other exception data fields 265 are used to contain other exception data information that may be important to any particular exception handler. Examples include: a detailed cause code, the program ID for the program that took the exception, the process state at the time of the exception, and/or location information about the exception.

Since this information is stored locally to the instance of the operating system error handler that is responsible for the exception, the information must be passed along to the subsequent exception handlers via call statement parameters or through service routines provided by the operating system itself. This presents two problems. If the information is made available through the call statement itself, the information, though needed by the current exception handler, may have been filtered out by intervening programs that have been invoked because of the exception. Similarly, the operating system error handler itself may deem it unnecessary to pass along the appropriate information with the thought that the initial exception handler will handle the problem.

While special operating system service routines do solve some of the problems inherent in passing the information from routine to routine, they are deficient in that they lack the ability to associate the particular exception with the instance of the operating system error handler that is responsible for the exception. This becomes an especially difficult problem when more that one instance of a particular exception handler is involved.

Figure 3A:
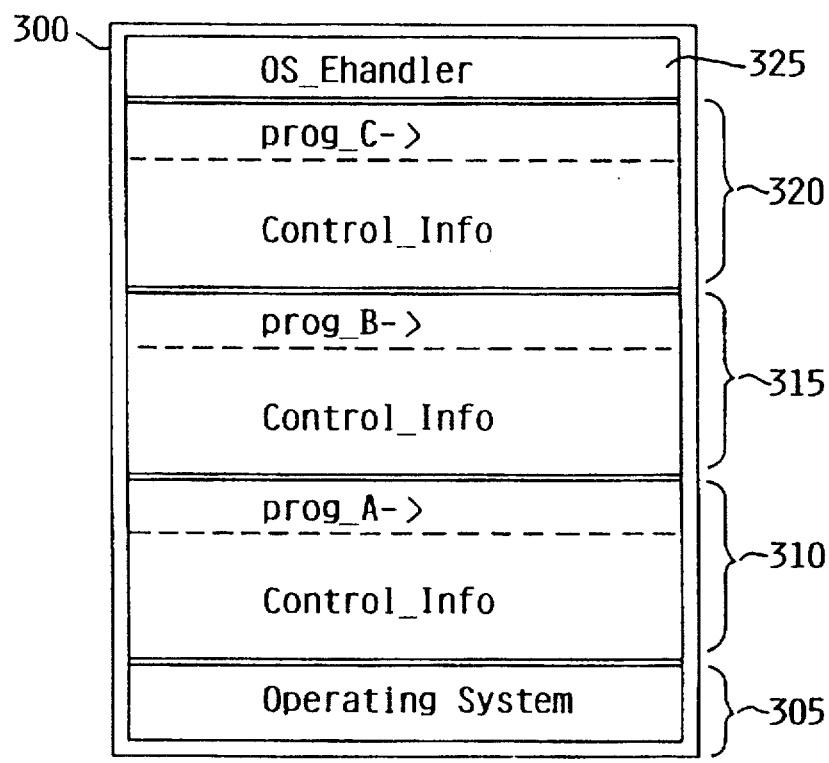
FIG. 3A shows how the call/return stack of the present invention is structured.

FIG. 3A shows a stack of the present invention in an example call scenario. Stack 300 comprises activation records 305, 310, 315, 320, and 325. Activation record 305 is used to represent operating system 135, while activation records 310, 315, and 320 represent three different computer programs. Each of activation records 310, 315, and 320 are shown to include pointers to an executable computer program and a control information block. Activation record 325 represents the OS error handler 125.

As with the previous example (there, activation record 210) activation record 310 is shown to be first on the stack. Hence, it represents the computer program (i.e., prog_A) that, in this example, was the first to execute on computer system 100. Prog_A called (invoked) prog_B so activation record 315 (i.e., the activation record that represents prog_B) was placed on the stack on top of activation record 310. Since in this example prog_B has in turn invoked prog_C, activation record 320 is located on top of activation record 315.

Figure 3B:
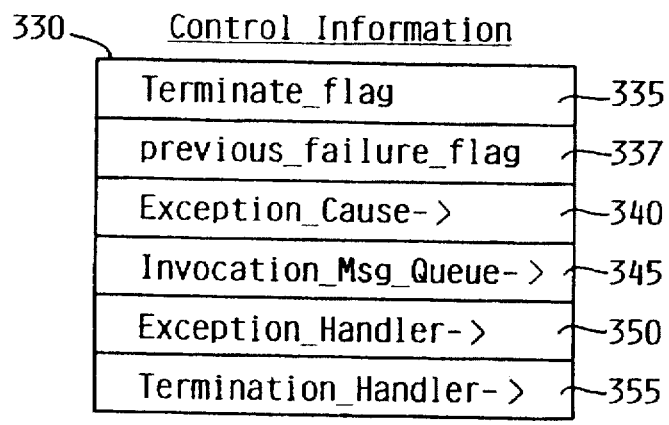
FIG. 3B shows how a control information record of the present invention is structured.

FIG. 3B shows the control information block of the present invention. Control information block 330 comprises terminate_flag 335, previous_failure_flag 337, exception_cause pointer 340, invocation_msg_queue 345, exception_handler pointer 350, and termination_handler pointer 355. The significance of these fields will be explained in detail in the discussion of FIGS. 4A through 5.

The presence of activation record 325 (as shown on FIG. 3A) indicates that an exception has been taken by one the programs represented by the other activation records on stack 300. When an exception occurs, operating system 135 invokes OS error handler 125. OS error handler 125 "traps" the program that took the exception by modifying its return address to return to a routine other than the subject program. This different routine is trap handler 120. In addition, OS error handler 125 also links an exception cause message to the activation record of the program that took the exception.

Figure 4A:
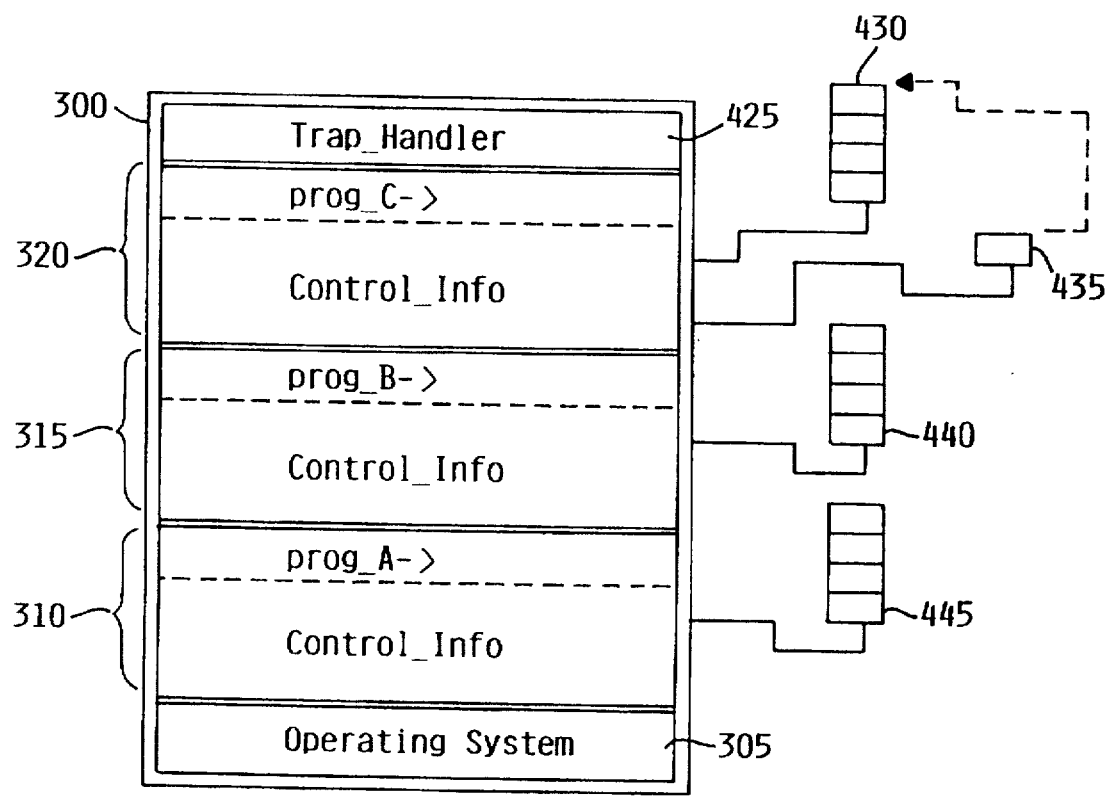
FIGS. 4A through 4F show example call/return stacks that are used in conjunction with the flow diagram of FIG. 5 to show how exceptions are handled by the present invention.
Figure 4B:
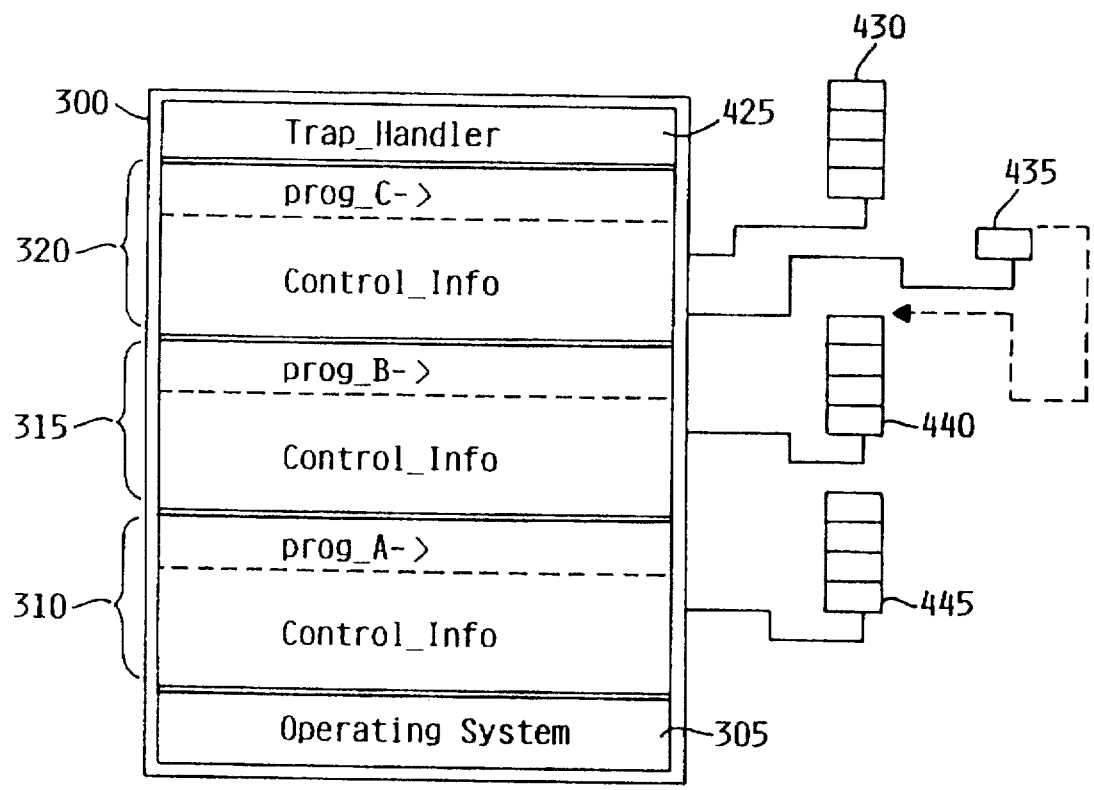
Figure 4C:
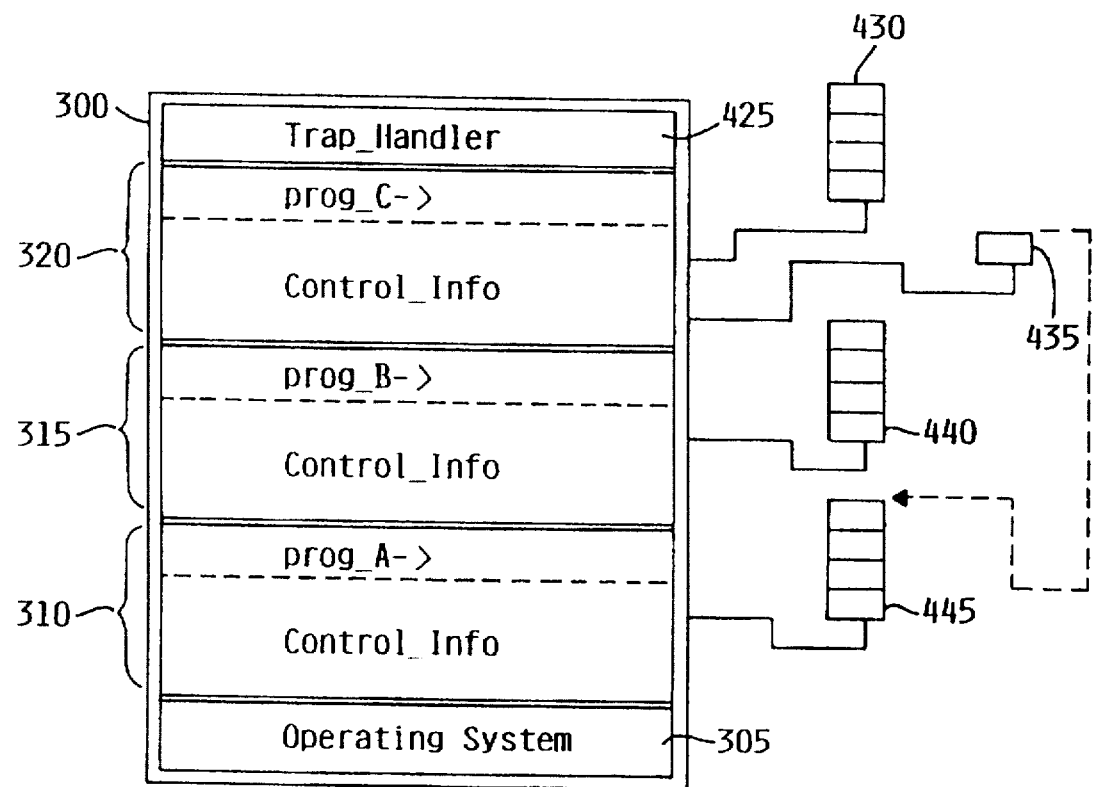
Figure 4D:
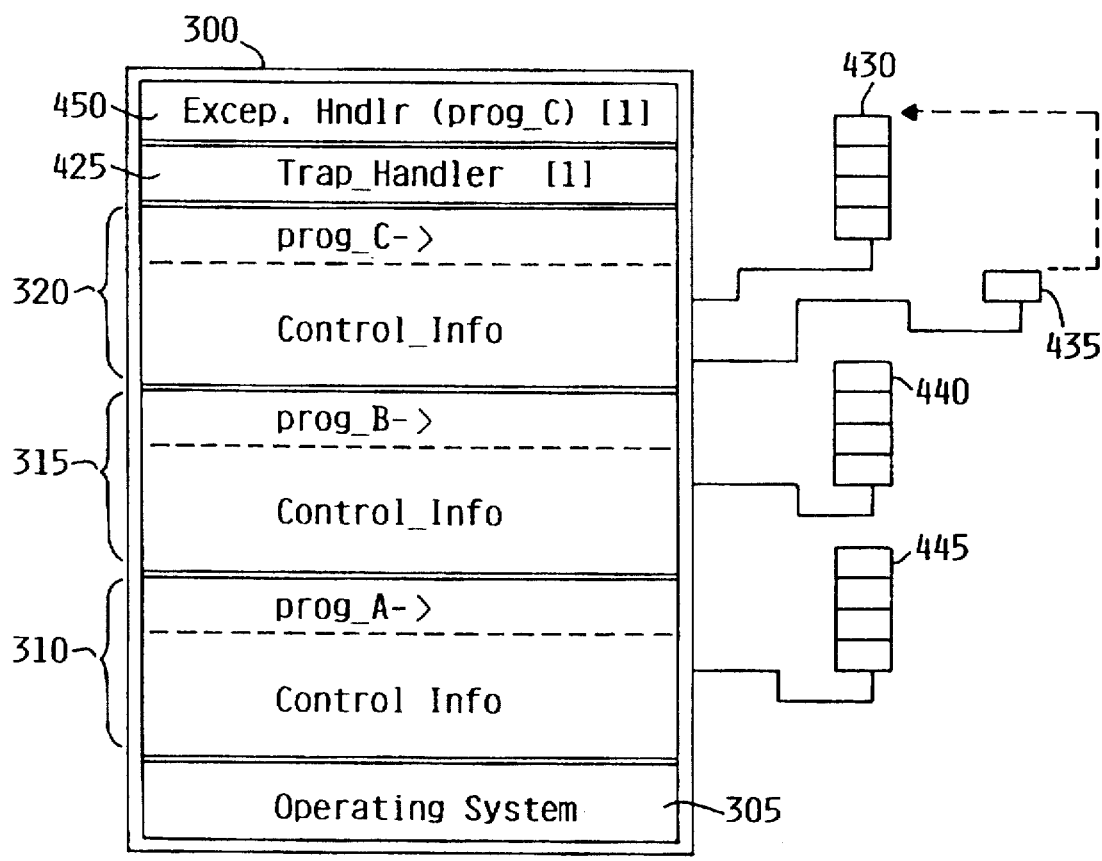
Figure 4E:
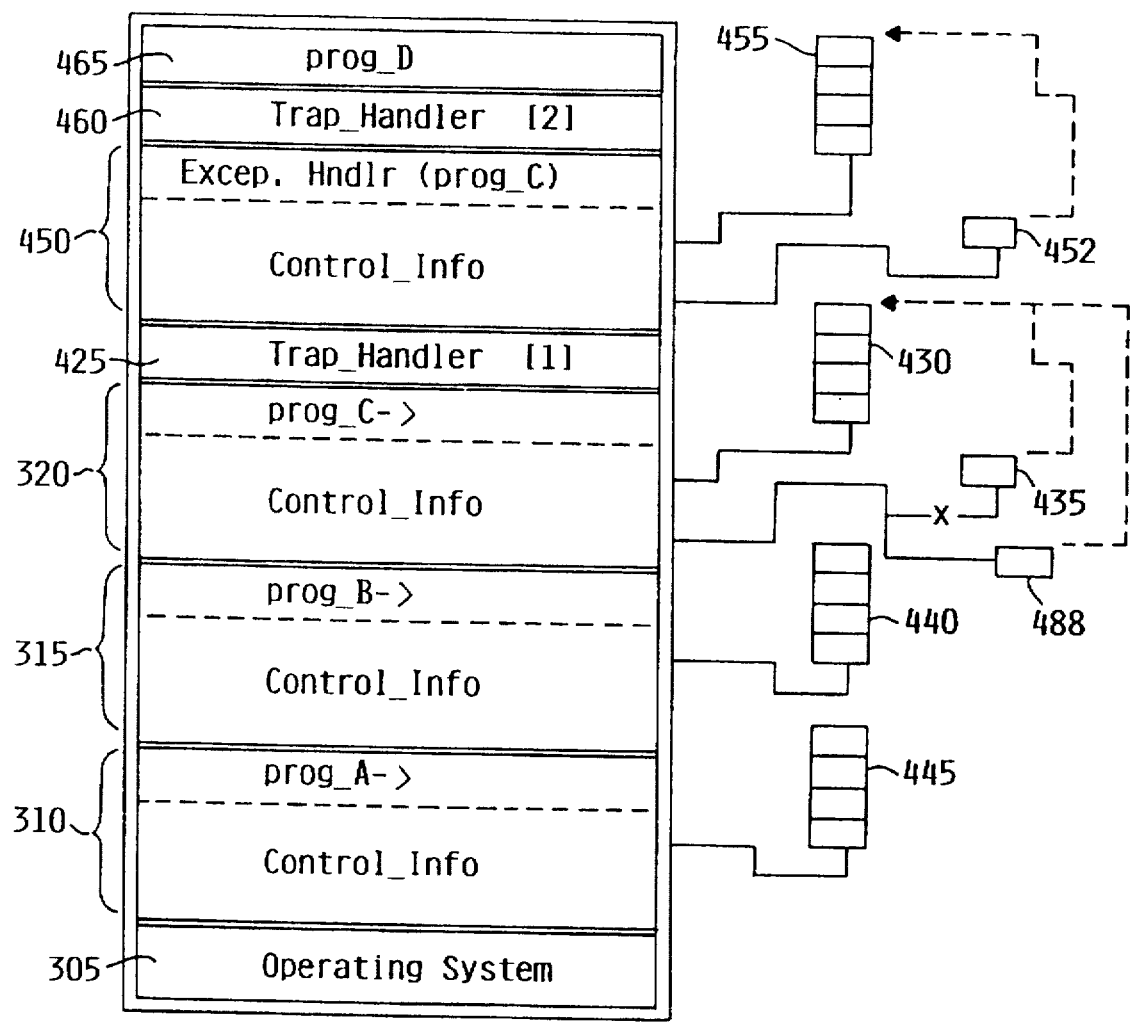
Figure 4F:
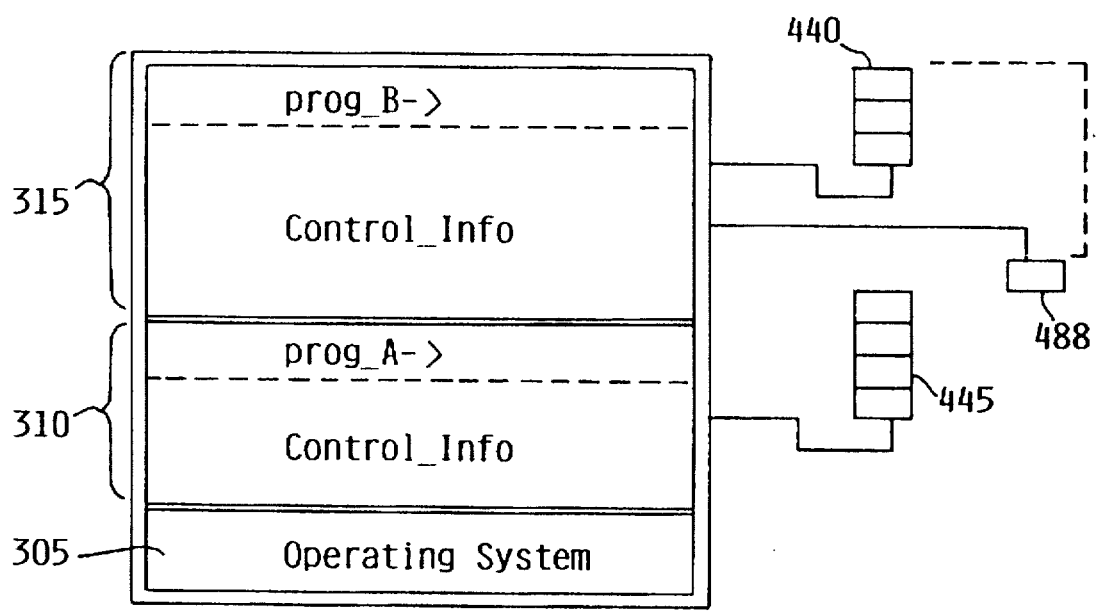
Figure 5A:
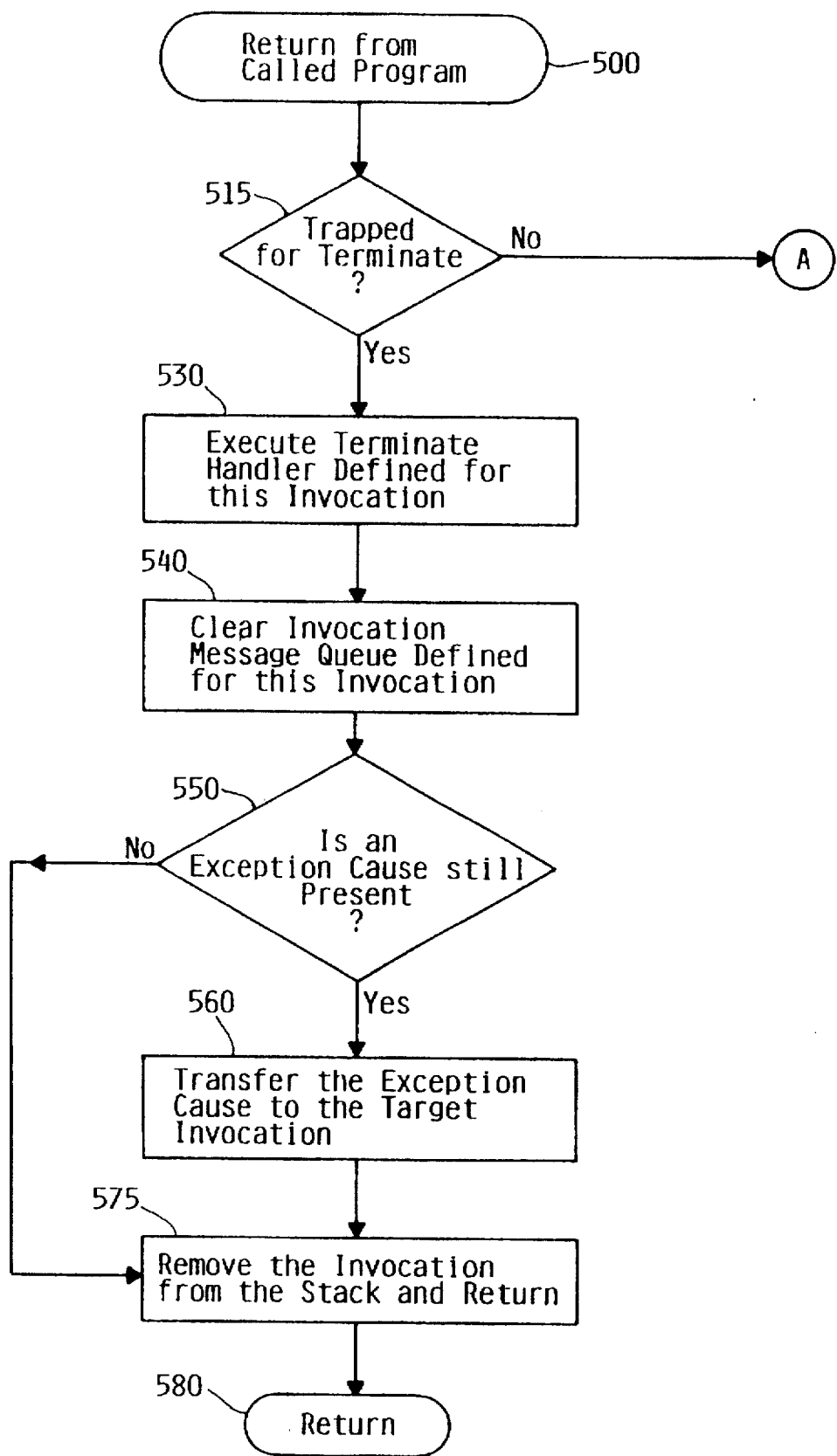
Figure 5B:
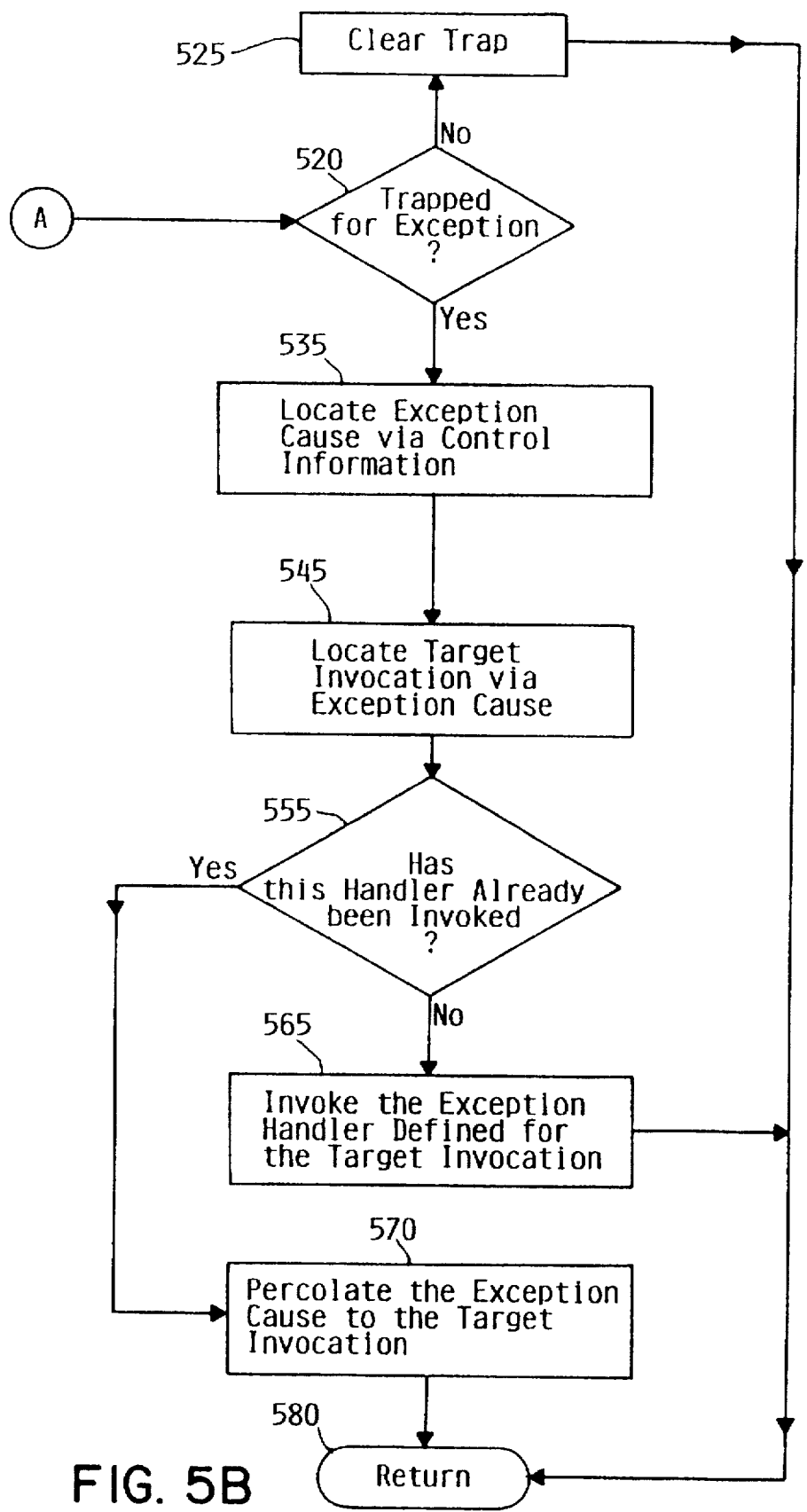

FIGS. 4A–4F will be used in conjunction with FIG. 5 to explain the inner workings of trap handler 120 and the other mechanisms of the present invention. FIG. 4A shows stack 300 after OS error handler 125 (as represented by activation record 325 on FIG. 3A) has performed its initial processing. In addition to activation records 305, 310, 315, and 320 which have been previously discussed, stack 300 is also shown to include trap handler 425, invocation message queues 430, 440, and 445, and exception cause message 435.

The mechanisms of the present invention handle terminating as well as non-terminating exception models with equal grace. The basic mechanisms of the present invention will be explained through an example which uses routines that operate under a non-terminating model. Once the fundamental mechanisms have been discussed, an example which uses routines that operate under a terminating model will be described. This latter example is best suited to explain how the mechanisms of the present invention provide a means by which the "dead routine" problem can be overcome.

NON-TERMINATING MODEL HANDLING

FIG. 5 is a flow diagram of trap handler 120. When trap handler 120 is invoked, it first determines whether the trapped routine has been "trapped for terminate" or "trapped for exception" 515. Trap handler 120 makes this determination by examining terminate_flag 335 (as shown on FIG. 3B). Terminate_flag 335 will be set to logical 1 if the subject program has been trapped for terminate. This may occur when programs that operate under a terminating exception model (e.g., ADA) are used. The flag may be set by a program that wishes to terminate itself or by an exception handler that wishes to terminate a particular program. For the purposes of this example, however, assume that the programs of stack 300 are written in the C programming language, and therefore, operate under a non-terminating exception model. This being the case, terminate_flag 335 will not be set (i.e., it will have a value of logical 0).

Assuming that an exception is initially signaled by prog_C, trap handler 120 will proceed to determine whether prog_C has been trapped for exception 520. It does this by attempting to locate the relevant exception cause through the control information of prog_C. Trap handler 120 will use exception_cause pointer 340 (as shown on FIG. 3B) to try and locate exception cause message 435 (as shown on FIG. 4A). If exception_cause pointer 340 is Nill (i.e., does not have a valid value), trap handler 120 knows that the subject program should no longer be trapped and proceeds to clear the trap 525 and return control to the subject program 580.

Here, however, exception_cause pointer 340 will contain a valid address and trap handler 120 will be able to locate exception cause message 435 (block 535). Exception cause message 435, having been previously linked to activation record 320 by OS error handler 125, contains all of the information that is available for the subject exception. This information may include a detailed cause code, the program ID for the program that took the exception, the process state at the time of the exception, and/or location information about the exception. In addition, exception cause message contains location information about the particular invocation message queue to which it is currently enqueued.

Exception cause message 435 will initially be enqueued to invocation message queue 430. After locating exception cause message 435, trap handler 120 will locate the appropriate control information (i.e., for the target invocation) via the location information contained within exception cause message 435 (block 545). Initially, trap handler 120 will locate the control information associated with prog_C. Though somewhat circular, this step is necessary to the design of a generic mechanism.

In block 555, trap handler 120 determines whether the exception handler associated with the particular program has already been invoked to handle this exception (i.e., whether it has already tried and failed). Trap handler 120 makes this determination by checking previous_failure_flag 337 (as shown on FIG. 3B). Since this exception handler has yet to be invoked, trap handler 120 sets previous_failure_flag 337 to logical 1 and invokes the exception handler associated with prog_C (block 565 identified by exception handler pointer 350 (as shown on FIG. 3B). It should be understood that this exception handler, as with the other exception handlers described herein, is logically represented on computer system 100 by exception handlers 115 of FIG. 1. For the purposes of this explanation, assume that this exception handler is unable to handle this particular exception. Since it is unable to handle the exception it returns control to trap handler 120 which itself returns (block 580).

Because prog_C remains trapped, trap handler 120 is immediately reinvoked. As before, trap handler 120 checks terminate_flag 335 (block 515) and exception cause message pointer 340 (block 520), locates exception cause message 435 (block 535), and locates the target invocation via exception cause message 435 (block 545). However, instead of proceeding to reinvoke the exception handler for prog_C. trap handler 120 determines (through use of previous_ failure_bit 337) that this exception handler has already tried and failed to solve the problem (block 555). Hence, trap handler 120 proceeds to move exception cause message down (i.e., percolate) to the invocation message queue of the next invocation on the stack. As shown on FIG. 4B, exception message 435 has been moved down to invocation message queue 440 which is associated with prog_B and activation record 315. Trap handler 120 will then return (block 580).

Since prog_C remains trapped, trap handler 120 is once again reinvoked. Trap handler 120 again checks terminate_ flag 335 (block 515) and exception cause message pointer 340 (block 520), locates exception cause message 435 (block 535), and locates the target invocation via exception cause message 435 (block 545). This time, however, the location information within exception cause message 435 leads trap handler 120 to the control information associated with prog_B (i.e., activation record 315). In block 555, trap handler 120 determines whether the exception handler associated with prog_B has already been invoked to handle this exception (i.e., whether it has already tried and failed). Trap handler 120 makes this determination by checking previous_failure_flag 337 (as shown on FIG. 3B). Since this exception handler has yet to be invoked, trap handler 120 sets previous_failure_flag 337 and invokes the exception handler (block 565 on FIG. 5) identified by exception handler pointer 350 (as shown on FIG. 3B). For the purposes of this explanation, assume that the exception handler for prog_B is able to handle the error condition. This being the case, the exception handler deletes exception cause message 435 causing exception_cause pointer 340 to be cleared. The exception handler will then return control to trap handler 120 which itself returns control to prog_C. At this point, however, prog_C remains trapped so control is immediately returned to trap handler 120. In block 520, trap handler 120 then determines that prog_C should no longer be trapped and proceeds to clear the trap by changing the return address of prog_C back to its original value 525. This accomplished, trap handler 120 returns control back to prog_C (block 580).

TERMINATING MODEL HANDLING

To understand how programs that operate under a terminating model are handled once again assume that prog_C takes an exception during execution and is, therefore, trapped as described above. Referring to FIGS. 4D through 4E and 5, trap handler 120 will similarly be invoked to handle the error. (Trap handler 120 is represented by activation record 425 on FIG. 4D). As before, trap handler 120 will find that terminate_flag 335 has not been set and that OS error handler 125 has created exception cause message 435 and linked it to activation record 320 via exception cause pointer 340. As described above, trap handler 120 will eventually invoke the exception handler associated with prog_C (shown in block 565 on FIG. 5 and as activation 450 on FIG. 4D) to handle the problem.

At this point, assume that the exception handler for prog_C itself takes an exception. This will cause another instance of trap handler 120 and another program to handle the second exception (i.e., an exception handler for the exception handler) to be placed on stack 300 (respectively represented as activation records 460 and 465 on FIG. 4E). The latter program is shown as prog_D on FIG. 4E.

The design of trap handler 120 allows a computer programmer to code an exception handler which moves the exception data down the stack so that it may be handled by another exception handler. Therefore, when prog_D is invoked by trap handler 120 (shown as block 565 of FIG. 5), it can, in addition to setting terminate_flag 335 for activation record 450, explicitly remove the exception cause message associated with this exception (shown as exception cause message 452) from the invocation message queue of activation record 450 and enqueue a replacement exception cause message (shown as exception cause message 488) to the invocation message queue of another exception handler. Assume that here this exception handler enqueues the subject exception cause message to the invocation message queue of prog_C (See FIG. 4E). Prog_D will also replace the initial exception cause message pointers in activation record 320 (i.e., pointer to exception cause message 435) with the new exception cause message (i.e., exception cause message 488).

The exception handler will then return to trap handler 120 which will be reinvoked because the exception handler for prog_C remains trapped. Trap handler 120 will determine that the exception handler for prog_C has been trapped for terminate (block 515), execute any termination handler that may be associated with this exception handler (block 530), clear the invocation message queue (block 540) [shown as invocation message queue 455 on FIG. 4E], and determine whether an exception cause message is still present (block 550). In this case, the exception cause message that represents the exception taken by the first instance of the exception handler for prog_C was explicitly removed by prog_D (i.e., exception cause message 452). Hence, trap handler 120 then removes the invocation (i.e., the invocation associated with the exception handler of prog_C) from stack 300 (block 575) and returns (block 580).

When trap handler 120 returns, it will return to prog_C which remains trapped. Hence, trap handler 120 is once again reinvoked. As described above, the exception handler for prog_C will eventually be invoked to deal with this new exception (i.e., the replacement exception generated by prog_D and represented by exception cause message 488). Assume that the exception handler for prog_C immediately recognizes that this exception is not one in which it can handle. Accordingly, the exception handler for prog C decides to percolate exception cause message 488 down to prog_B (i.e., activation record 315) and terminate prog_C. To do so, it moves exception cause message 488 down from invocation message queue 430 to invocation message queue 440 and sets terminate_flag 335 for activation record 320. The exception handler then returns control to trap handler 120 which itself returns in block 580. However, when trap handler 120 attempts to return control to prog_C, it finds that prog_C remains trapped and it is, therefore, immediately reinvoked.

As with the exception handler for prog_C, trap handler 120 will determine that terminate_flag 335 has been set (block 515) and proceeds to block 530 where it will invoke the terminate handler for prog_C. This is accomplished via terminate_handler pointer field 355 of the control information block of activation record 320. The termination handler is one of termination handlers 117. The subject termination handler will then proceed to clean up after prog_C. This task may involve freeing memory and locks and/or performing other general tear down operations.

Once the subject termination handler has completed its processing, it will return control to trap handler 120. Trap handler 120 will then proceed to clear the invocation message queue that is defined for prog_C (block 540) and check whether there is an exception cause message that has been created for prog_C (block 550). In this case, exception cause message 488 will remain linked to activation record 320. Hence, trap handler 120 transfers exception cause message 488 down to activation record 315 (i.e., the activation record for prog__B) [block 560]. At this point, trap handler 120 proceeds to remove prog__C from the stack (block 575) and return (block 580). Processing will then continue in prog__B where trap handler 120 will invoke the exception handler for prog__B to handle the exception represented by exception cause message 488. If a prior art solution were being employed, the exception handler for prog__B would be forced to handle this second exception before the dead routines (prog__C, the exception handler for prog__C, and possibly prog__D) could be removed from the stack. This occurs because prior art solutions keep all of the exception data local to the OS error handler that is initiated to handle the exception. (See FIG. 2B and the associated text.) The exception data of the present invention, however, is kept external to any running program and is, therefore, available to all running programs.

At this point, processing will continue as described above. As shown on FIG. 4F, the dead routine (prog__C) has been removed. The second exception (i.e., that represented by exception cause message 488) will be handled in the normal course.

EXTERNALIZED EXCEPTION DATA

As discussed in the summary section, the present invention also solves the exception data management problems of the prior art. Via the pointers of the control information block (as shown on FIG. 4B), the exception data has been "externalized" so that processes that need the information can gain access to it without the need to depend upon passed variables or special system calls. Further, there is no confusion about which exception data is stored in which location since the exception data is directly tied to the activation record of the routine that is ultimately responsible for handling the exception.

Although a specific embodiment of the present invention has been disclosed, it will be understood by those skilled in the art that additional variations in form and detail may be made within the scope of the following claims.

What is claimed is:

1. A method for handling exception conditions within a computer system, said method comprising the steps of:

detecting an exception condition within a running program, said running program being identified by an entry in a stack, said entry being an activation record;

invoking an error handler;

trapping said running program, said running program being trapped by said error handler;

creating an exception cause message, said exception cause message being created by said error handler;

linking said exception cause message to said activation record, said exception cause message being linked by said error handler;

queuing said exception cause message to a message queue that is referenced in said activation record, said exception cause message being queued by said error handler; and invoking an exception handler via a pointer contained in said activation record.

2. A method for handling exception conditions within a computer system, said method comprising the steps of:

a) detecting an exception condition within a first program, said first program being identified within a stack frame, said stack frame containing a plurality of activation records, one of said plurality of activation records being a current activation record, said first program having a first activation record that represents a running program which is initially said current activation record;

b) invoking an error handler;

c) trapping said first program, said first program being trapped by said error handler;

d) creating an exception cause message, said exception cause message being created by said error handler;

e) linking said exception cause message to said first activation record, said exception cause message being linked to said first activation record by said error handler;

f) queuing said exception cause message to a first message queue that is contained in said first activation record, said exception message being queued by said error handler;

g) determining whether said first program has an exception handler associated with it by checking a pointer field within said current activation record;

h) removing said exception cause message from said first message queue and queuing said exception cause message to a second message queue whenever the outcome of said determining step indicates that there is no exception handler associated with said current activation record, said second message queue being contained in a second activation record, said second activation record being associated with a second program, said second activation record becoming said current activation record;

i) repeating steps g) and h) until said pointer field indicates that an exception handler is associated with said current activation record; and j) invoking said exception handler.

3. A method for handling exception conditions within a computer system, said method comprising the steps of:

detecting an exception condition within a running program, said running program being identified by an entry in a stack, said entry being an activation record;

invoking an error handler;

trapping said running program, said running program being trapped by said error handler;

creating an exception cause message, said exception cause message being created by said error handler;

linking said exception cause message to said activation record, said exception cause message being linked by said error handler;

queuing said exception cause message to a message queue that is referenced in said activation record, said exception cause message being queued by said error handler;

invoking an exception handler via a pointer contained in said activation record;

marking said activation record to indicate that said running program is to be terminated; and terminating said running program by removing said activation record from said stack.

4. A method for handling exception conditions within a computer system, said method comprising the steps of:

a) detecting an exception condition within a first program, said first program being identified within a stack frame, said stack frame containing a plurality of activation records, one of said plurality of activation records being a current activation record, said first program having a first activation record that represents a running program which is initially said current activation record;

b) invoking an error handler;

c) trapping said first program, said first program being trapped by said error handler;

d) creating an exception cause message, said exception cause message being created by said error handler;

e) linking said exception cause message to said first activation record, said exception cause message being linked to said first activation record by said error handler;

f) queuing said exception cause message to a first message queue that is contained in said first activation record, said exception message being queued by said error handler;

g) determining whether said first program has an exception handler associated with it by checking a pointer field within said current activation record;

h) removing said exception cause message from said first message queue and queuing said exception cause message to a second message queue whenever the outcome of said determining step indicates that there is no exception handler associated with said current activation record, said second message queue being contained in a second activation record, said second activation record being associated with a second program, said second activation record becoming said current activation record;

i) repeating steps g) and h) until said pointer field indicates that an exception handler is associated with said current activation record;

j) invoking said exception handler;

k) marking said current activation record to indicate that said running program is to be terminated; and l) terminating said running program by removing said current activation record from said stack.

5. An apparatus for handling exception conditions within a computer system, said apparatus comprising:

means for detecting an exception condition within a running program, said running program being identified by an entry in a stack, said entry being an activation record;

means for invoking an error handler;

means for trapping said running program, said running program being trapped by said error handler;

means for creating an exception cause message, said exception cause message being created by said error handler;

means for linking said exception cause message to said activation record, said exception cause message being linked by said error handler;

means for queuing said exception cause message to a message queue that is referenced in said activation record, said exception cause message being queued by said error handler; and means for invoking an exception handler via a pointer contained in said activation record.

6. An apparatus for handling exception conditions within a computer system, said apparatus comprising:

a) means for detecting an exception condition within a first program, said first program being identified within a stack frame, said stack frame containing a plurality of activation records, one of said plurality of activation records being a current activation record, said first program having a first activation record that represents a running program which is initially said current activation record;

b) means for invoking an error handler;

c) means for trapping said first program, said first program being trapped by said error handler;

d) means for creating an exception cause message, said exception cause message being created by said error handler;

e) means for linking said exception cause message to said first activation record, said exception cause message being linked to said first activation record by said error handler;

f) means for queuing said exception cause message to a first message queue that is contained in said first activation record, said exception message being queued by said error handler;

g) means for determining whether said first program has an exception handler associated with it by checking a pointer field within said current activation record;

h) means for removing said exception cause message from said first message queue and queuing said exception cause message to a second message queue whenever the outcome of said determining step indicates that there is no exception handler associated with said current activation record, said second message queue being contained in a second activation record, said second activation record being associated with a second program, said second activation record becoming said current activation record;

i) means for repeating said determining means and said removing means until said pointer field indicates that an exception handler is associated with said current activation record; and j) means for invoking said exception handler.

7. An apparatus for handling exception conditions within a computer system, said apparatus comprising:

means for detecting an exception condition within a running program, said running program being identified by an entry in a stack, said entry being an activation record;

means for invoking an error handler;

means for trapping said running program, said running program being trapped by said error handler;

means for creating an exception cause message, said exception cause message being created by said error handler;

means for linking said exception cause message to said activation record, said exception cause message being linked by said error handler;

means for queuing said exception cause message to a message queue that is referenced in said activation record, said exception cause message being queued by said error handler;

means for invoking an exception handler via a pointer contained in said activation record;

means for marking said activation record to indicate that said running program is to be terminated; and means for terminating said running program by removing said activation record from said stack.

8. An apparatus for handling exception conditions within a computer system, said apparatus comprising:

a) means for detecting an exception condition within a first program, said first program being identified within a stack frame, said stack frame containing a plurality of activation records, one of said plurality of activation records being a current activation record, said first program having a first activation record that represents a running program which is initially said current activation record;

b) means for invoking an error handler;

c) means for trapping said first program, said first program being trapped by said error handler;

d) means for creating an exception cause message, said exception cause message being created by said error handler;

e) means for linking said exception cause message to said first activation record, said exception cause message being linked to said first activation record by said error handler;

f) means for queuing said exception cause message to a first message queue that is contained in said first activation record, said exception message being queued by said error handler;

g) means for determining whether said first program has an exception handler associated with it by checking a pointer field within said current activation record;

h) means for removing said exception cause message from said first message queue and queuing said exception cause message to a second message queue whenever the outcome of said determining step indicates that there is no exception handler associated with said current activation record, said second message queue being contained in a second activation record, said second activation record being associated with a second program, said second activation record becoming said current activation record;

i) means for repeating said determining means and said removing means until said pointer field indicates that an exception handler is associated with said current activation record;

j) means for invoking said exception handler;

k) means for marking said current activation record to indicate that said running program is to be terminated; and l) means for terminating said running program by removing said current activation record from said stack.

9. A program product for handling exception conditions within a computer system, said program product comprising:

a recordable media; and an operating system recorded on said recordable media, said operating system comprising, a) means for detecting an exception condition within a first program, said first program being identified within a stack frame, said stack frame containing a plurality of activation records, one of said plurality of activation records being a current activation record, said first program having a first activation record that represents a running program which is initially said current activation record;

b) means for invoking an error handler;

c) means for trapping said first program, said first program being trapped by said error handler;

d) means for creating an exception cause message, said exception cause message being created by said error handler;

e) means for linking said exception cause message to said first activation record, said exception cause message being linked to said first activation record by said error handler;

f) means for queuing said exception cause message to a first message queue that is contained in said first activation record, said exception message being queued by said error handler;

g) means for determining whether said first program has an exception handler associated with it by checking a pointer field within said current activation record;

h) means for removing said exception cause message from said first message queue and queuing said exception cause message to a second message queue whenever the outcome of said determining step indicates that there is no exception handler associated with said current activation record, said second message queue being contained in a second activation record, said second activation record being associated with a second program, said second activation record becoming said current activation record;

i) means for repeating said determining means and said removing means until said pointer field indicates that an exception handler is associated with said current activation record; and j) means for invoking said exception handler.

10. A program product for handling exception conditions within a computer system, said program product comprising:

a recordable media; and an operating system recorded on said recordable media, said operating system comprising, means for detecting an exception condition within a running program, said running program being identified by an entry in a stack, said entry being an activation record;

means for invoking an error handler;

means for trapping said running program, said running program being trapped by said error handler;

means for creating an exception cause message, said exception cause message being created by said error handler;

means for linking said exception cause message to said activation record, said exception cause message being linked by said error handler;

means for queuing said exception cause message to a message queue that is referenced in said activation record, said exception cause message being queued by said error handler;

means for invoking an exception handler via a pointer contained in said activation record;

means for marking said activation record to indicate that said running program is to be terminated; and means for terminating said running program by removing said activation record from said stack.

11. A program product for handling exception conditions within a computer system, said program product comprising:

a recordable media; and an operating system recorded on said recordable media, said operating system comprising, a) means for detecting an exception condition within a first program, said first program being identified within a stack frame, said stack frame containing a plurality of activation records, one of said plurality of activation records being a current activation record, said first program having a first activation record that represents a running program which is initially said current activation record;

b) means for invoking an error handler;
c) means for trapping said first program, said first program being trapped by said error handler;
d) means for creating an exception cause message, said exception cause message being created by said error handler;
e) means for linking said exception cause message to said first activation record, said exception cause message being linked to said first activation record by said error handler;
f) means for queuing said exception cause message to a first message queue that is contained in said first activation record, said exception message being queued by said error handler;
g) means for determining whether said first program has an exception handler associated with it by checking a pointer field within said current activation record;
h) means for removing said exception cause message from said first message queue and queuing said exception cause message to a second message queue whenever the outcome of said determining step indicates that there is no exception handler associated with said current activation record, said second message queue being contained in a second activation record, said second activation record being associated with a second program, said second activation record becoming said current activation record;
i) means for repeating said determining means and said removing means until said pointer field indicates that an exception handler is associated with said current activation record;
j) means for invoking said exception handler;
k) means for marking said current activation record to indicate that said running program is to be terminated; and
l) means for terminating said running program by removing said current activation record from said stack.

\* \* \* \* \*